(12) United States Patent
Li et al.

(10) Patent No.: US 11,986,073 B2
(45) Date of Patent: May 21, 2024

(54) HANDLE MECHANISM

(71) Applicant: JULY & CO PTY LTD, Collingwood (AU)

(72) Inventors: Shiyao Li, Templestowe (AU); Athan Didaskalou, Carlton (AU)

(73) Assignee: JULY & CO PTY LTD, Collingwood (AU)

( * ) Notice: Subject to any disclaimer, the term of this patent is extended or adjusted under 35 U.S.C. 154(b) by 455 days.

(21) Appl. No.: 17/313,723

(22) Filed: May 6, 2021

(65) Prior Publication Data

US 2021/0251359 A1    Aug. 19, 2021

Related U.S. Application Data

(63) Continuation of application No. PCT/AU2019/051217, filed on Nov. 6, 2019.

(30) Foreign Application Priority Data

Nov. 8, 2018  (AU) ................................. 2018101671

(51) Int. Cl.
| | | |
|---|---|---|
| *A45C 13/28* | (2006.01) | |
| *A45C 5/03* | (2006.01) | |
| *G06F 1/16* | (2006.01) | |
| *H02J 7/00* | (2006.01) | |
| *H04W 88/08* | (2009.01) | |

(52) U.S. Cl.
CPC .............. *A45C 13/28* (2013.01); *A45C 5/03* (2013.01); *G06F 1/1632* (2013.01); *H02J 7/0045* (2013.01); *H04W 88/08* (2013.01)

(58) Field of Classification Search
CPC ......... A45C 1/02; A45C 11/00; A45C 13/005; A45C 13/10; A45C 15/00; A45C 2001/028; A45C 2011/002
See application file for complete search history.

(56) References Cited

U.S. PATENT DOCUMENTS

| | | | | |
|---|---|---|---|---|
| 4,146,682 | A | * | 3/1979 | Nakao ................. H01M 50/213 439/352 |
| 5,482,147 | A | * | 1/1996 | Wang ....................... A45C 5/14 190/115 |
| 10,470,543 | B2 | * | 11/2019 | Kogelnik ............... A45C 13/28 |
| 2017/0127783 | A1 | * | 5/2017 | Korey .................... A45C 15/00 |
| 2017/0290401 | A1 | | 10/2017 | Bhatnagar et al. |
| 2017/0339260 | A1 | * | 11/2017 | Haymond ............. H02J 7/0013 |

FOREIGN PATENT DOCUMENTS

| | | |
|---|---|---|
| CN | 205728589 U | 11/2016 |
| CN | 107173943 A | 9/2019 |

OTHER PUBLICATIONS

International Search Report with Written Opinion issued for corresponding International Patent Application PCT/ AU2019/051217 dated Jan. 7, 2020.

* cited by examiner

*Primary Examiner* — Tri M Mai
(74) *Attorney, Agent, or Firm* — Myers Wolin, LLC

(57) ABSTRACT

An apparatus is provided for removably holding a first powerbank, the apparatus including a frame, a handle connectable to the frame, and a first holder connectable to the frame. The first powerbank is able to be removably held by the first holder. The disclosure is further directed handle mechanisms and to a suitcase or luggage including the apparatus or handle mechanisms.

14 Claims, 16 Drawing Sheets

HANDLE MECHANISM

CROSS-REFERENCE TO RELATED APPLICATIONS

This application is a continuation of International Patent Application No. PCT/AU2019/051217, filed Nov. 6, 2019, which claims priority from Australian Patent Application No. 2018101671, filed Nov. 8, 2018, and these applications are incorporated herein by reference for all purposes as if fully set forth herein.

FIELD OF THE INVENTION

In a particular aspect, the invention relates to a retractable handle mechanism that is suitable for mounting on a suitcase and has a removable powerbank holder.

BACKGROUND

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and broad consistory statements herein.

A powerbank is a portable device that can be connected with other electronic devices, such as smartphones and tablets, in order to recharge the batteries of such devices. The powerbank itself has batteries that are rechargeable, commonly with a USB power supply. Given the widespread use and reliance on smartphones and tablets, many travelers have a portable power supply in the form of a powerbank to ensure that their electronic devices remain sufficiently charged even while travelling overseas and on long flights.

Another portable device that is useful for travelers is a mobile router, that converts cellular signals (e.g. 3G, 4G, LTE) to hotspots for internet connectivity. Providing internet connectivity to a traveller (e.g. via a WiFi access point), so that the internet is available via a traveller's personal computing device such as a smartphone, tablet or laptop, can be an invaluable tool for the traveller.

Thus, it may be advantageous to provide luggage with an easily externally accessible powerbank holder adapted for: holding the powerbank while connecting it to recharge other devices during periods of travel; and/or easy removal of the powerbank for mandatory customs checking, charging of other devices, or self-charging.

In other respects, it may be advantageous to provide luggage with the ability to hold either a combination powerbank/mobile router, or a powerbank, to provide flexibility to the user as to the choice of powerbank they utilise (NB. the term 'powerbank' is hereafter used in an inclusive sense to include powerbanks and combination powerbank/mobile routers, unless otherwise indicated). It may also be beneficial to provide options to the user regarding the use of powerbank holding apparatus within the luggage. Some holding apparatus may be larger in dimension and thereby less desirable, in some contexts, due to the additional volume that they may occupy within the luggage (and the related loss of luggage storage or battery size that larger holding apparatus may necessitate).

Further, not all travelers want or need to carry a powerbank on their luggage every trip. On such occasions the powerbank holder (with or without the powerbank therein) is simply taking up space that could be used for storage of other items, risking damage during the trip, or risking being stolen, for no reason.

Moreover, some current powerbank holders have a powerbank ejection mechanism which can become dysfunctional, causing the powerbank to become stuck in the powerbank holder and unable to be removed. This is particularly problematic at customs where removal of the powerbank is required or else luggage on which the jammed powerbank is disposed will be confiscated by the customs agent.

Thus, it may be advantageous to provide an apparatus and/or process which reduces, limits, overcomes, or ameliorates some of the problems, drawbacks, or disadvantages associated with the prior art, or provides an effective alternative.

SUMMARY

In a first aspect, the invention provides an apparatus for removably holding a first powerbank, the apparatus including: a frame to which a handle is connectable; a handle connectable to the frame; a first holder connectable to the frame, the first powerbank able to be removably held by the first holder.

The first powerbank is preferably a combination powerbank/mobile router. The combination powerbank may provide for wireless connectivity to one or more users. Alternatively, the combination powerbank may provide for wired connection may be provided via USB, or other means.

The combination powerbank may provide for wireless connectivity via a WiFi network and/or Bluetooth pairing. Alternatively, other wireless communication protocols may be employed. The combination powerbank may be connectable to an internet service provider. Preferably, the combination powerbank includes a SIM port for receiving a SIM card.

The combination powerbank may be adapted to provide internet access to one or more users via a wireless local area network, or via a wired network.

The first holder is preferably a holding compartment.

The apparatus may include a first locking mechanism able to lockably hold the first powerbank to the apparatus. The first locking mechanism may be disposed on or in a housing for the handle.

Preferably, the first locking mechanism is able to lockably hold the first powerbank to the handle housing. The first locking mechanism is preferably adapted to engage an end portion of the first powerbank.

The first locking mechanism may include a male portion, and the first powerbank includes a female portion. The first locking mechanism is preferably moveable between a locked position and an unlocked position, whereby in the locked position the male portion of the first locking mechanism is received by the female portion of the first powerbank to lock the first powerbank in the first holder, and in the unlocked position the first powerbank is removable from the first holder. The male portion may be a projecting tab. The female portion may be a recess.

The first locking mechanism may include a first ejection mechanism for ejecting the first powerbank at least partly from the first holder upon unlocking of the first locking mechanism.

The first ejection mechanism preferably includes one or more biasing members. Preferably, the one or more biasing members are each located towards a base of the first holder.

The first ejection mechanism may include two biasing members that are spaced apart, and located on opposing sides of the first holder.

The frame may include two elongate portions.

Preferably, the apparatus includes a support cross member extending between the two elongate portions of the frame.

Therein the one or more biasing members are each preferably located within the plane defined by the two elongate portions.

A lower section of each of the one or more biasing members is preferably housed in the support cross member.

The apparatus may include one or more fixing means to fix the support cross member to the frame and/or first holder. Preferably, the fixing means comprise screws.

Preferably, the first locking mechanism is able to lockably hold the first powerbank between the housing handle and the support cross member.

Preferably, the first locking mechanism is able to lockably hold the first powerbank between the two elongate portions of the frame.

The apparatus may include a base cross member extending between a base of each of the two elongate portions.

The frame may include a lockable lid adapted to lockably hold the first powerbank in the first holder.

Preferably, the first holder is adapted to removably hold a second holder. The second holder is preferably adapted to removably hold a second powerbank.

The first holder is preferably adapted to directly hold both the second holder and the first powerbank. Preferably, the apparatus is able to directly hold the first powerbank in the first holder, and the second powerbank in the second holder.

The lockable lid is preferably adapted to lockably hold the first powerbank in the first powerbank holder, and lockably hold the second holder in the first holder. The lid is preferably positionable above the first holder and/or second holder. Opening of the lid may provide user access to one or more of, or any combination of: the first holder, the second holder, the first powerbank and/or the second powerbank Preferably, the first locking mechanism is able to lockably hold the second holder.

The second holder may include a female portion for lockably engaging with the male portion of the first locking mechanism. The female portion of the second holder may be a recess.

Preferably, the apparatus includes a second ejection mechanism for ejecting the second powerbank at least partly from the second holder upon activation of the second ejection mechanism.

The second ejection mechanism may be moveable between an ejection position and a holding position, such that in the ejection position the second powerbank at least partially ejects from the second holder. Preferably, the ejection mechanism is moveable between the ejection position and the holding position by the user pressing down on the second powerbank to engage a push plate of the second ejection mechanism. The second ejection mechanism may include a second biasing member adapted to urge the second powerbank at least partly from the second holder when the second ejection mechanism is in the ejection position. The second biasing member preferably includes at least one spring adapted to uncoil from a compressed position when the second powerbank is held in or by the second holder to a released position where the second powerbank is at least partly released from the second holder.

The second ejection mechanism may be disposed on or in the second holder.

The second ejection mechanism is adapted to engage an end portion of the second powerbank.

The second powerbank may include an aluminium casing for managing the heat profile of the powerbank.

The second powerbank may include one or more of, or any combination of: a USB port for charging; a USB port for wired connection of a user device to the powerbank for data exchange; an ethernet port for wired connection of a user device to the powerbank for data exchange.

The second powerbank includes a plurality of LED indicators to indicate one or more of power level; signal strength; the type or mode of wireless connection.

The second powerbank may be a combination powerbank/ mobile router.

Preferably, the first powerbank includes one or more of, or any combination of: a USB port for charging; a USB port for wired connection of a user device to the powerbank for data exchange; an ethernet port for wired connection of a user device to the powerbank for data exchange.

The first powerbank may include an aluminium casing for managing the heat profile of the powerbank.

The first powerbank preferably includes a plurality of LED indicators to indicate one or more of power level; signal strength; the type or mode of wireless connection.

According to another aspect of the invention, there is provided a suitcase including the apparatus as described herein. In another aspect, the invention provides an apparatus comprising:

a frame;

a handle formed with, disposed on, or disposable on, the frame;

a first holder disposed, or adapted to be disposed, on or in relation to the frame, and a second holder removably held, or adapted to be removably held, in or by the first holder.

The second holder may hold, or be adapted to hold, a powerbank.

When the first holder is removed from the second holder, the first holder may be adapted to hold an object. The object may comprise travel documentation.

The first holder may comprise an outer receptacle, and the second holder may comprise an inner receptacle.

The apparatus may comprise a handle mechanism. The handle mechanism may be mounted on to luggage.

In another form, the apparatus comprises the luggage. The luggage may comprise a suitcase.

When the inner receptacle is removed from the outer receptacle, the outer receptacle may be adapted to hold an object. The object may comprise travel documentation.

The outer receptacle may comprise a holding compartment, while the inner receptacle may comprise a powerbank holder.

In another aspect, the invention provides a handle mechanism comprising:

a frame;

a handle formed with, disposed on, or disposable on, the frame;

a first holder disposed, or adapted to be disposed, on or in relation to the frame;

a second holder removably held, or adapted to be removably held, in or by the first holder; the second holder holding, or being adapted to hold, a powerbank;

a first release mechanism for releasing the second holder from the first holder; and a second release mechanism for releasing the powerbank from the second holder.

The first release mechanism may comprise a first ejection mechanism. The first release mechanism may comprise a first locking mechanism.

The second release mechanism may comprise a second ejection mechanism. The second release mechanism may comprise a second locking mechanism.

In another aspect, the invention provides a handle mechanism for a suitcase comprising:
 a frame;
 a handle formed with or disposed on the frame;
 a first holder disposed on or in relation to the frame,
 a powerbank holder removably held in or by the first holder, the powerbank holder being adapted to removably hold a powerbank.

The first holder may comprise a holding compartment.

The handle mechanism may comprise the powerbank.

The holding compartment may be configured to hold an object when the powerbank holder is removed.

The holding compartment may be generally cuboidal in shape, or the shape of rectangular prism.

The holding compartment may comprise a viewing portion or portions through which an object can be seen within. The viewing portion or portions may comprise one or more windows. Thus, the holding compartment may comprise a grille or case defining one of more windows. The grille or case may be removable from the frame.

The handle mechanism may comprise a first locking mechanism allowing locking of the powerbank holder in the holding compartment, and unlocking of the powerbank holder allowing removal from the holding compartment.

The first locking mechanism may comprise a first ejection mechanism for ejecting the powerbank holder at least partly from the holding compartment upon unlocking of the powerbank holder.

The first ejection mechanism may comprise a biasing member adapted to urge the power bank holder at least partly from the holding compartment when the first locking mechanism is unlocked.

The biasing member may comprise at least one spring adapted to extend from a compressed position when the powerbank holder is held in or by the holding compartment to a released position where the powerbank holder is at least partly released from the holding compartment.

The first locking mechanism may comprise:
 a blocking member adapted to block release of the powerbank holder from the holding compartment; and
 a touch member which, when upon touching, moving, or compression by a user, is adapted to directly or indirectly cause movement of the blocking member so that is no longer blocking release of the powerbank holder.

The blocking member may comprise a block with a male portion or tab at least partly positioned in a female portion or recess when blocking release of the powerbank holder.

The touch member may comprise a push button. Compression of the push button may directly cause movement of the blocking member out of its blocking position.

The handle mechanism may further comprise a second locking mechanism allowing locking of the powerbank in the powerbank holder, and unlocking of the powerbank allowing removal from the powerbank holder.

The second locking mechanism may comprise a second ejection mechanism for ejecting the powerbank at least partly from the powerbank holder upon unlocking of the powerbank. In some embodiments, locking of the powerbank involves locking of the ejection mechanism, which has the effect of locking by preventing or avoiding ejection of the powerbank.

The second ejection mechanism may comprise a second biasing member adapted to urge the power bank at least partly from the powerbank holder when the second locking mechanism is unlocked.

The second biasing member may comprise at least one spring adapted to uncoil from a compressed position when the powerbank is held in or by the powerbank holder to a released position where the powerbank is at least partly released from the powerbank holder.

The frame may comprise a telescopic portion. The handle may comprise a telescopic handle for telescopic engagement with the telescopic portion of frame. The telescopic handle may be moveable between a retracted position whereby the handle is retracted with respect to the telescopic portion and an extended position whereby the handle is extended with respect to the telescopic portion.

The telescopic portion of the frame may comprise one or more tubular members adapted to telescopically receive one or more corresponding rod members or tubular members comprised by the telescopic portion of the handle. Alternatively, or additionally, the telescopic portion of the frame may comprise one or more rod members or tubular members adapted to be telescopically received one or more corresponding tubular members comprised by the telescopic portion of the handle.

The frame may comprise a lid. The lid may be positioned above the holding compartment and/or powerbank holder. Opening of the lid may provide user access to the holding compartment and/or powerbank holder.

In another aspect, the invention provides a suitcase having a handle mechanism, the handle mechanism comprising:
 a frame;
 a handle formed with or disposed on the frame;
 a holding compartment disposed on or in relation to the frame,
 a powerbank holder removably held in or by the holding compartment, the powerbank holder being adapted to removably hold a powerbank.

The features described in relation to one or more aspects of the invention are to be understood as applicable to other aspects of the invention, unless the context expressly indicates otherwise.

Other aspects of the invention are also disclosed.

BRIEF DESCRIPTION OF THE DRAWINGS

In order that the invention may be more clearly understood and put into practical effect there shall now be described in detail embodiments in accordance with the invention. The ensuing description is given by way of non-limitative examples only and is with reference to the accompanying drawings, wherein.

DETAILED DESCRIPTION OF THE PREFERRED EMBODIMENTS

Figure 1A:
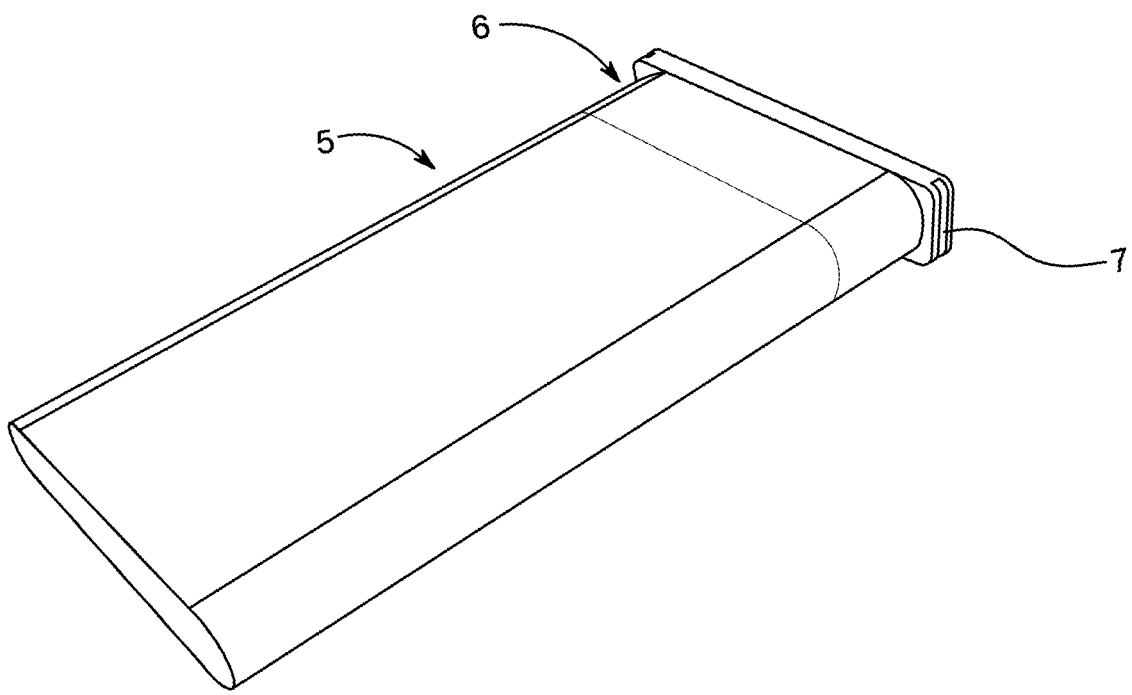
FIG. 1A is an elevated rear perspective view of a combination power bank/mobile router.
Figure 1B:
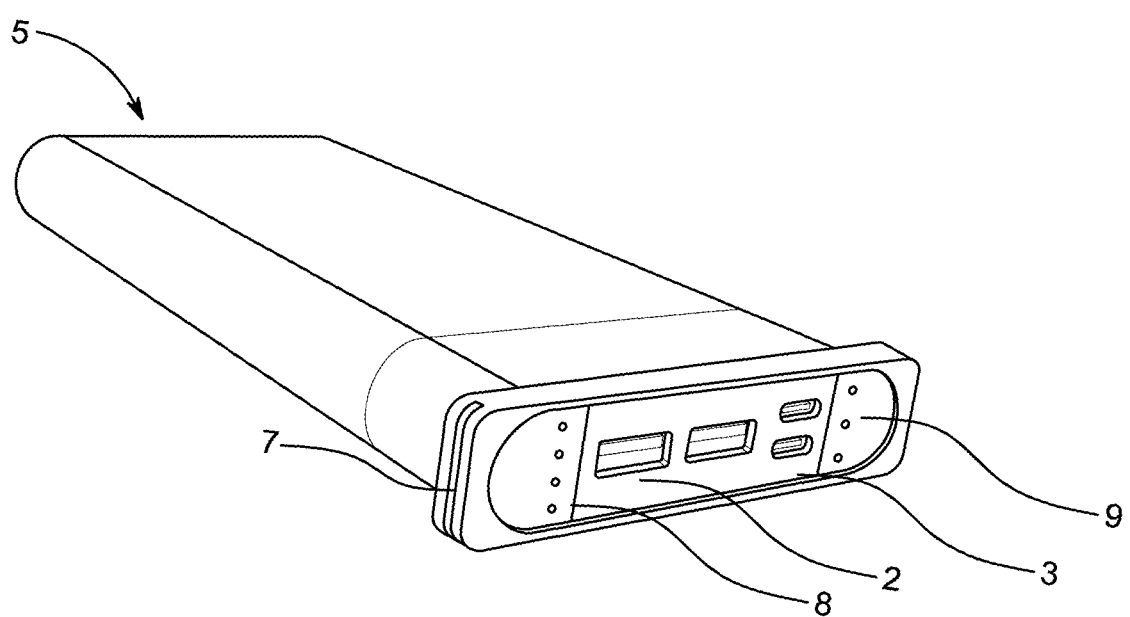
FIG. 1B is a front perspective view of the combination powerbank/mobile router of FIG. 1A.

Referring to FIGS. 1A and 1B, there is depicted a combination powerbank 5, providing both powerbank and mobile router functionality. Further, the combination powerbank provides wireless connectivity to one or more users via both WiFi and Bluetooth pairing, and includes the requisite transmitters and antennas (which are located within the body of the combination powerbank 5) for establishing the connection and permitting communication via the relevant wireless protocols. Alternatively a wired connection may be provided to a user's device via one of the USB ports 2, or one of the micro USB ports, 3 in the combination powerbank 5. In other embodiments (not shown), wired connectivity may be provided by another port (e.g. USB-C, pin connectors like Apple Lightning, ethernet ports such as a RJ45 jack). The combination powerbank 5 is connectable to an internet service provider, via the antennae (not shown), to access for example, 3G, 4G or 5G cellular networks. The combination powerbank includes a SIM port for receiving a SIM card to enable connection to the internet service provider. The powerbank is adapted to establish a wireless access network (WAN), to enable wireless data exchange between the devices connected to the network.

The combination powerbank 5 includes a plurality of LED lights, some of which indicate the power level of the powerbank 8, and others of which indicate the nature or strength of the connection 9 (e.g. whether connected via Bluetooth).

The combination powerbank further includes an end portion 6, and a pair of recesses 7 located in a respective pair of protruding portions of the end portion 6.

Figure 1C:
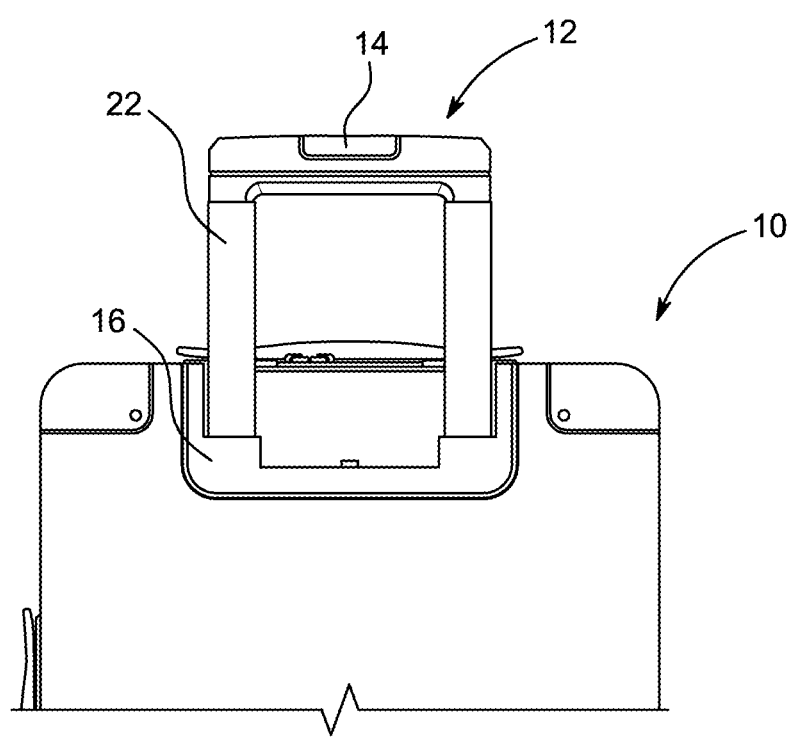
FIG. 1C is a front view of an example suitcase having an example handle mechanism with an extended handle in accordance with an embodiment of the invention.
Figure 2:
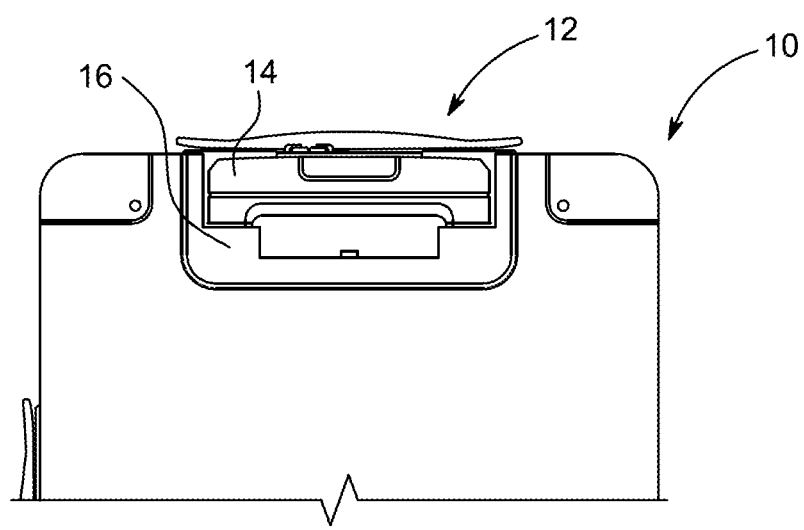
FIG. 2 is a front view of the example suitcase and handle mechanism showing the handle retracted.

Referring to FIGS. 1 and 2, there is shown a suitcase, generally designated 10, comprising a handle mechanism, generally designated 12, in accordance with an embodiment of the invention. It will be appreciated that the handle mechanism 12 includes an apparatus for removably holding a powerbank, and in particular the combination powerbank referred to in FIGS. 1A and 1B. The handle mechanism 12 comprises a handle 14 and a handle housing 16. The handle 14 is movable with respect to the handle housing 16 between an extended position, as shown in FIG. 1, whereby the handle 14 extends out from the housing 16 in order to facilitate user grasping, and a retracted position, as shown in FIG. 2, whereby the handle is retracted towards and largely within the housing 16 in order to make the suitcase 10 more compact for stowing and storage.

Figure 3:
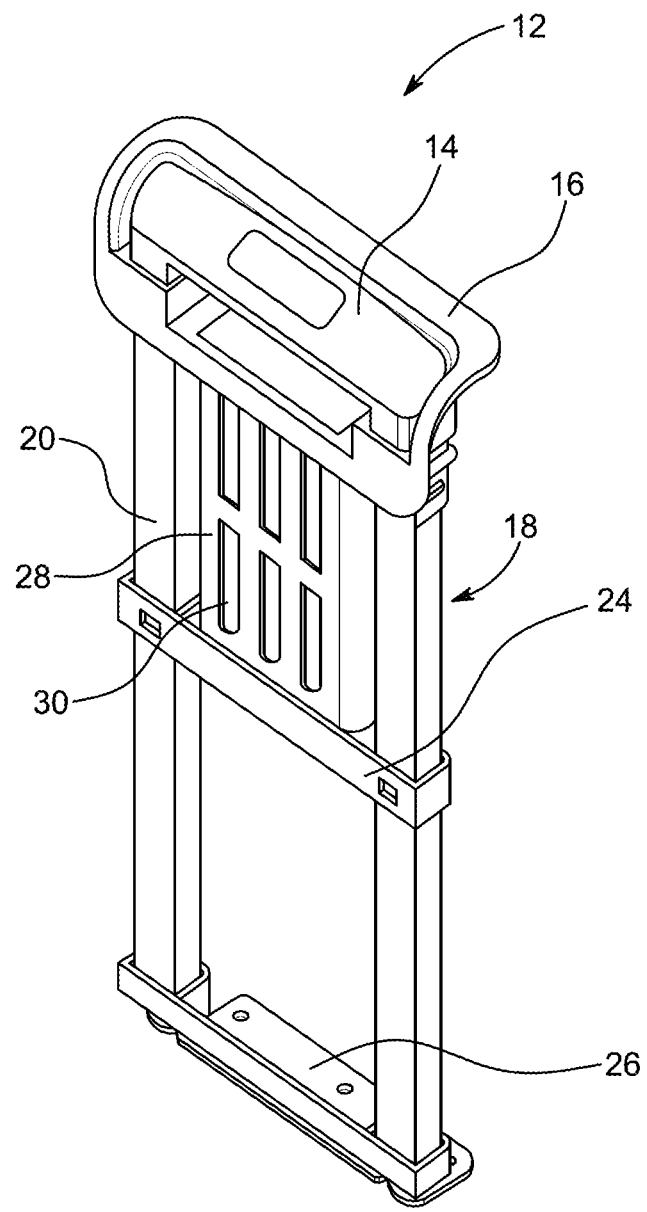
FIG. 3 is a front perspective view of the example handle mechanism.
Figure 4:
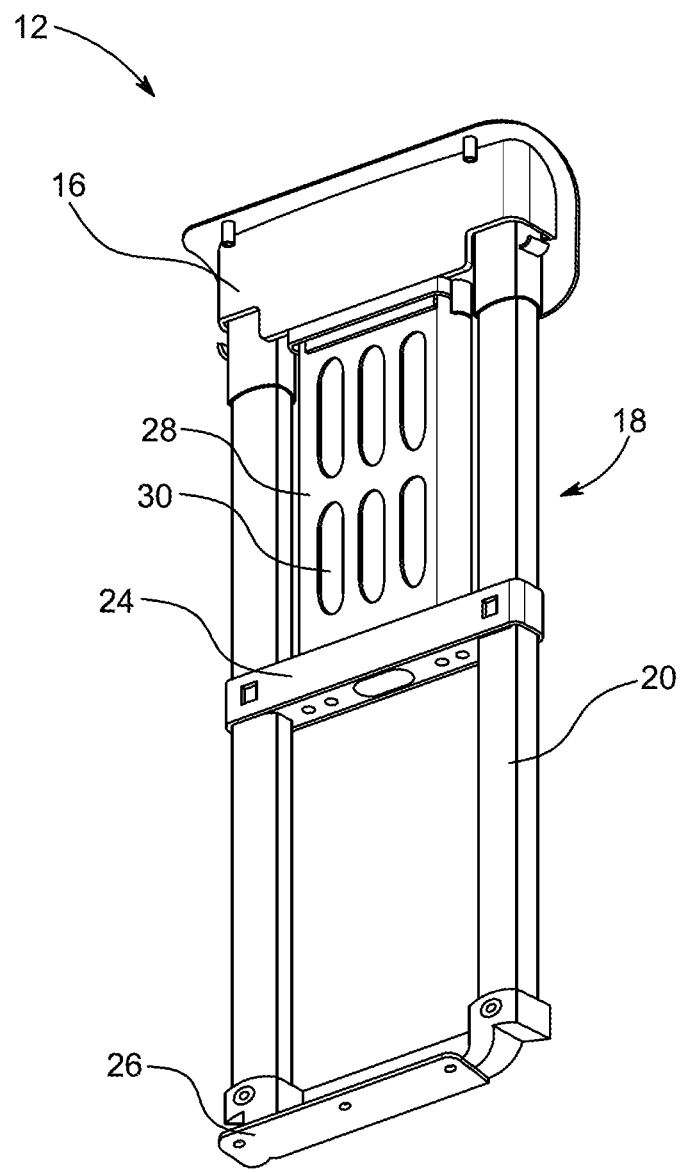
FIG. 4 is a rear perspective view of the example handle mechanism.
Figure 5:
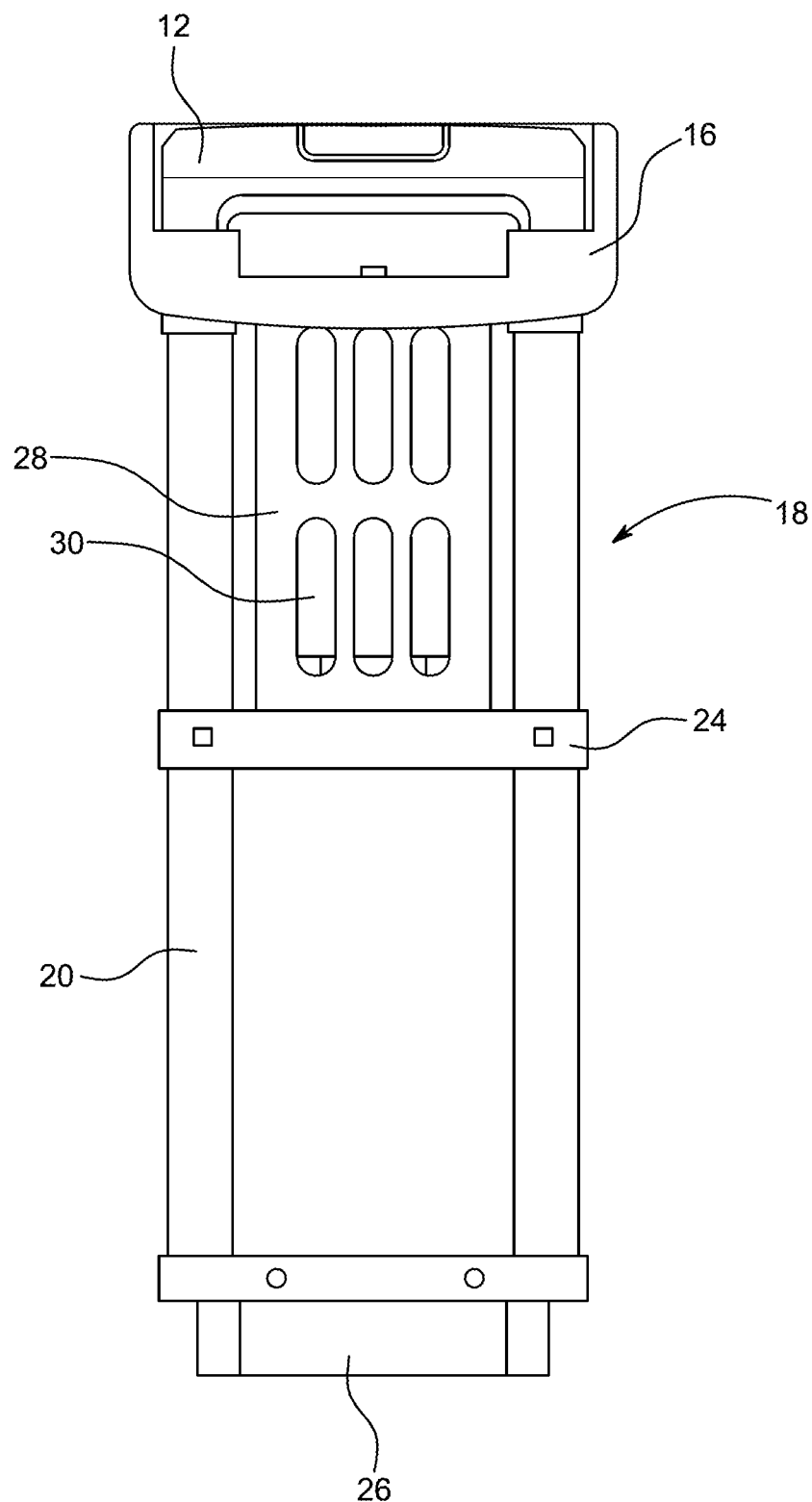
FIG. 5 is a front view of the example handle mechanism.

Referring now to FIGS. 3 to 5, there is shown the handle mechanism 12 disassembled from the rest of the suitcase 10. The handle mechanism 12 comprises a frame member 18. The frame member 18 comprises the handle housing 16, a pair of elongate tubular telescopic portions 20 extending down from the handle housing 16, a support cross member 24 extending between the telescopic portions 20 about half way down, and a base cross member 26 extending between telescopic portions 20 at their base. The base cross member 26 have a mounting plate for mounting at the base of a handle cavity defined in the suitcase 10. The telescopic portions 20 of the frame telescopically receive and engage telescopic portions 22 (see FIG. 1) of the handle.

A holding receptacle or compartment 28 in the form of a grilled pocket or cage is positioned between the telescopic portions 20 of the frame to each side, and supported above and beneath by the handle housing 16 and support cross member 24 respectively. Placed within the holding compartment 28 is a powerbank holder 30 in the form of a case that is suitable for holding a powerbank used for charging a traveller's smartphone. The powerbank within the powerbank holder 30 is not a combination powerbank/mobile router, providing powerbank functionalities without mobile router functionalities.

The holding compartment (i.e. the first holder) 28 is suitable for directly receiving and holding the combination powerbank 5, depicted in FIGS. 1A and 1B.

Figure 6:
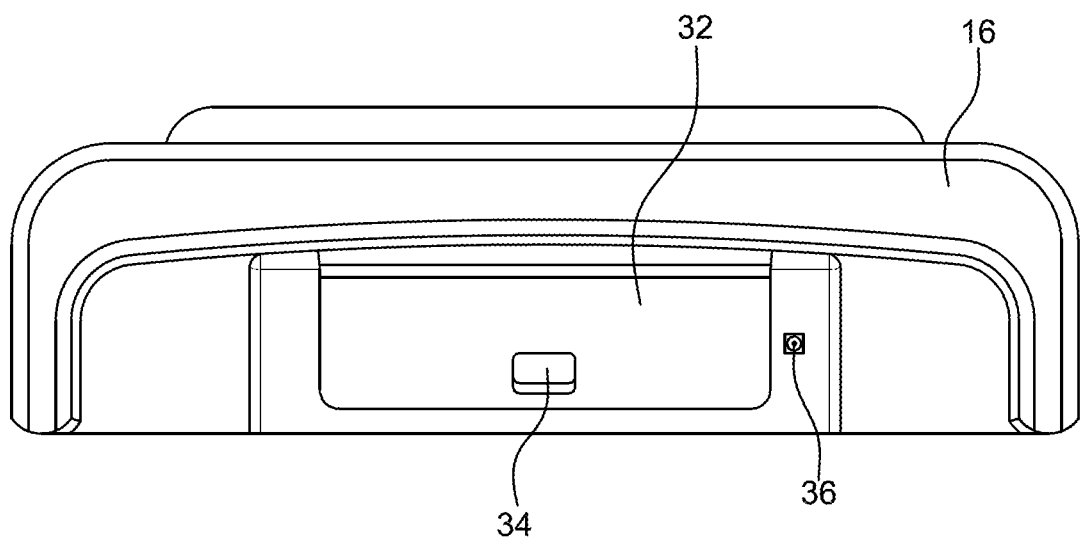
FIG. 6 is a top view of the example handle mechanism.

Referring now to FIG. 6, there is shown a top view of the handle housing 16, the handle housing having a centrally placed flip top lid 32, which lid, is in this instance, is closed over the top of the power bank holder 30 and holding compartment 28. Alternatively, the lid may be closed over the top of the combination powerbank 5, directly. Projecting centrally from the lid 32 is a notch 34 that can be pushed back by a user to unlock the lid, and pushed forward again to lock the lid, when the lid is closed.

Thus, in order to open the lid, the notch 34 is first urged back to unlock the lid, and then, by grasping a projecting portion of the notch 34, the user is able to flip the front edge of the lid simultaneously upward and backward, thereby opening the lid 32. With the lid open, the user can see and touch the top of the powerbank in the powerbank holding case 30; likewise, where the combination powerbank 5 is directly received into the holding compartment 28, the top of the combination powerbank 5 can be seen and accessed by the user. Where the powerbank holding case 30 is utilised to holder the powerbank, the user can remove the powerbank from the case 30 by pushing it down until it unlocks and bounces up past the lid opening via a second locking mechanism. While in this raised position, the user can lift the powerbank the remaining distance out of the power bank holder 30 by hand, thereby completely removing the powerbank from the powerbank holder 30.

Figure 7:
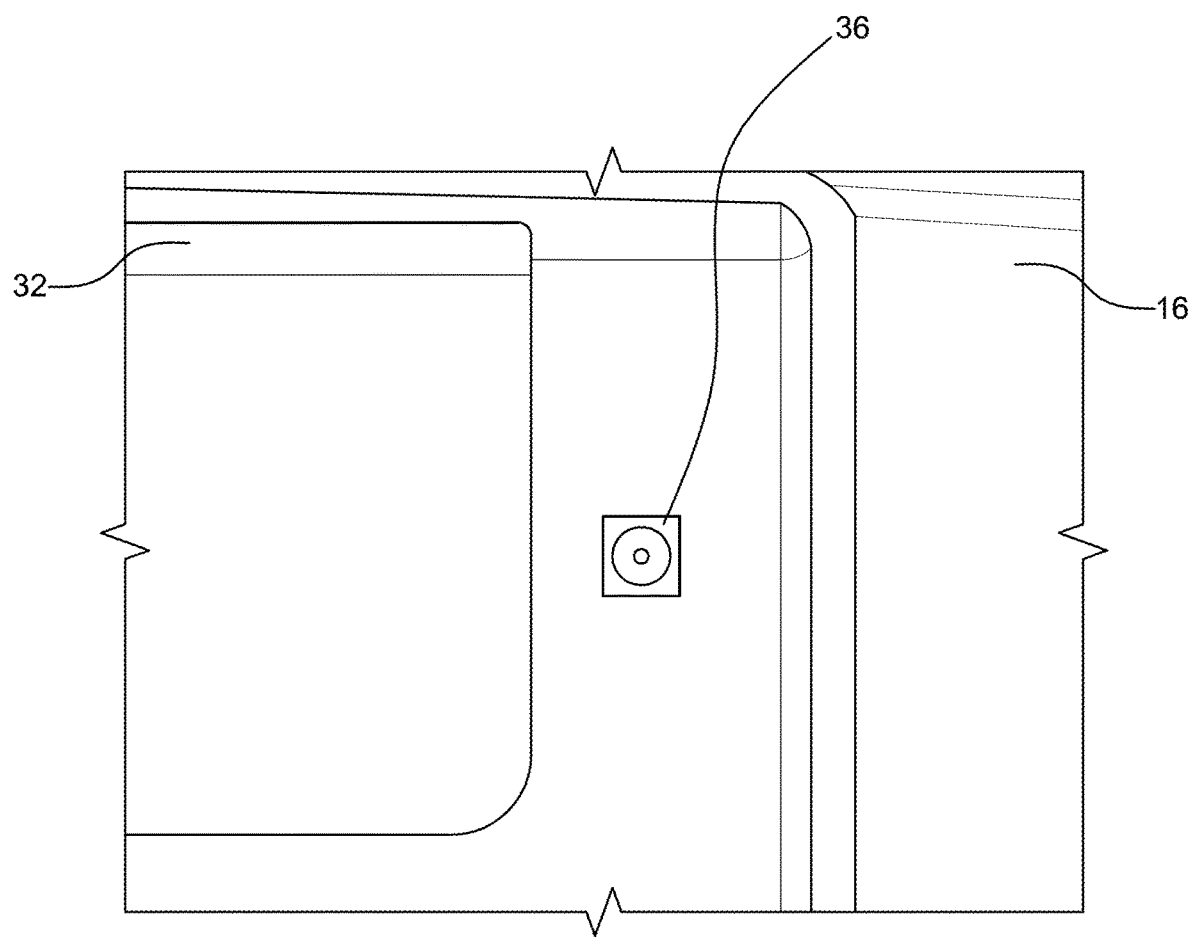
FIG. 7 is a magnified top view of the example handle mechanism, focusing in on a push button.

Referring now to FIG. 7, there is shown a push button 26 present just to the left of the lid 32. The push button 36 in the example shown requires a pointy object such as a pen to push it down easily and effectively, but also not by accident, the result being unlocking a first locking mechanism and partial ejection of the powerbank holder/case 30 or combination powerbank 5 from its resting position or place in the holding compartment 28, to one in which it is projects up partially from the holding compartment 28 and through the lid. In this raised position, the powerbank holder 30 or combination powerbank may be grasped and pulled through the lid by hand, enabling full removal of the powerbank case 30 or combination powerbank 5 from the holding compartment 28. Note that as the powerbank holder 30 is mounted upon the powerbank ejector 38, the powerbank ejector will necessarily be simultaneously removed during removal of the powerbank holder 30. Further note that the powerbank may or may not be present in the powerbank holder 30 during removal of the powerbank holder/case 30 (plus powerbank ejector 38) from the holding compartment 28. Further, it is noted the powerbank ejector 38 is not present in combination powerbank 5 (it has a substantially flat bottom surface), so the combination powerbank does not hold nor eject any other item, as it has a substantially integral form.

Figure 8:
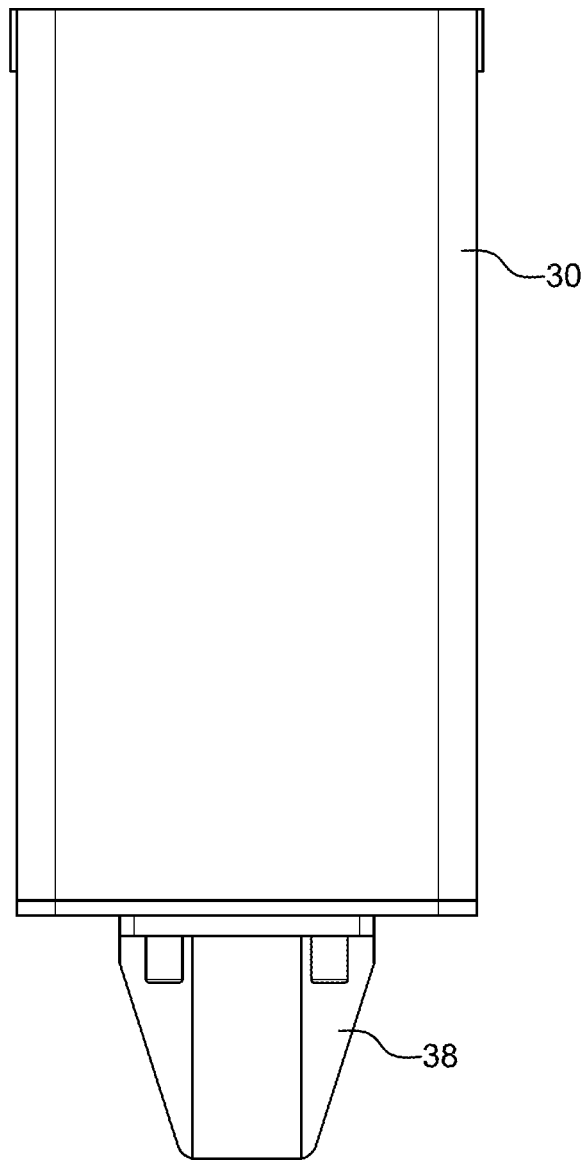
FIG. 8 is a front view of a powerbank case atop a powerbank ejector that is adapted to eject a powerbank from the powerbank case.
Figure 9A:
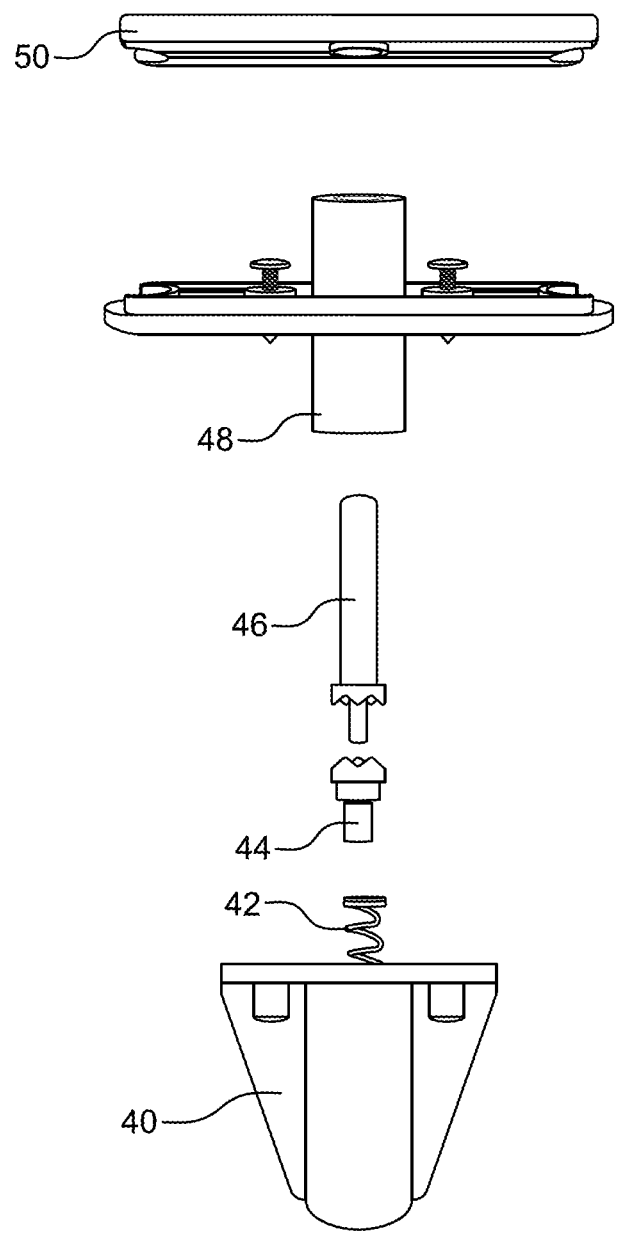
FIG. 9a is front exploded view of the powerbank ejector.
Figure 9B:
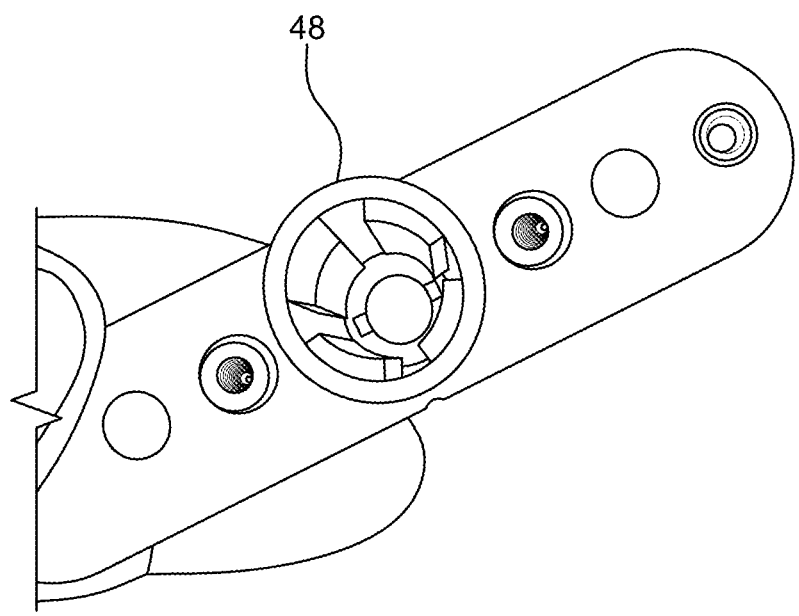
FIG. 9b is a bottom view of a collar member of the powerbank ejector.
Figure 9C:
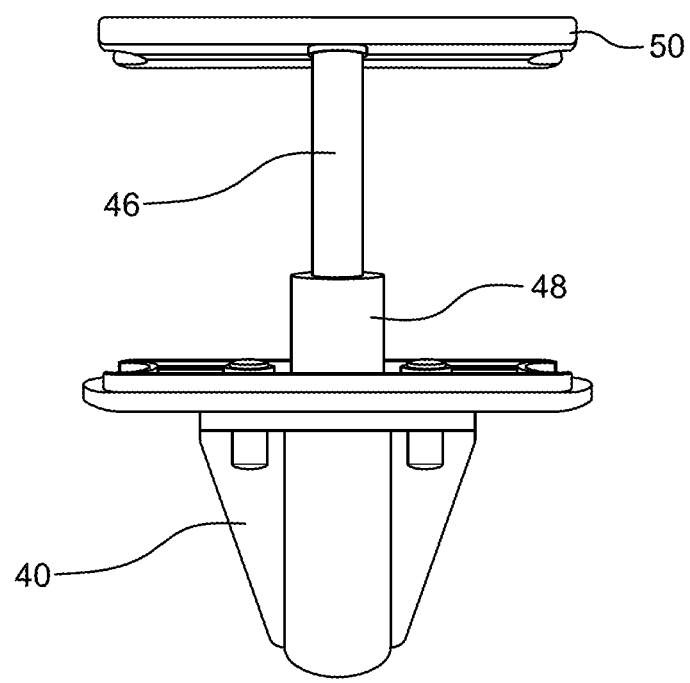
FIG. 9c is a front view of the powerbank ejector.

Referring now to FIG. 8, there is shown the powerbank holder 30 mounted upon the powerbank ejector 38, both fully removed from the holding compartment 28. FIGS. 9a-c show the components of the powerbank ejector 38, the type of which is known in the art, comprising: a spring housing 40; a spring 42 housed by the spring housing 40; a lower cam member 44 having a body mounted at a top end of the spring 43; an upper cam member 46 that rotatably engages with the lower cam member 44 beneath, the upper cam member 46 having an upwardly extending elongate plunger with multiple external ridges; a barrel member 48 having a round central passage up through which the plunger of the upper cam member 46 projects, the barrel member defining grooves in the internal wall of the central passage that engage with the ridges of the plunger for locking and unlocking thereof; and a push plate 50 on top of which the powerbank rests, the push plate being engaged centrally beneath with a top end of the plunger.

When a user presses down on the top of the resting powerbank in the powerbank holder 30, the top plate 50, which supports the powerbank from beneath, is forced downwardly, resulting in a sequence of movements of the inter-engaged ejector 38 components and unlocking of the ejector 38. Following the downward push, the user releases their hand from the top of the powerbank, allowing the compressed spring 42 to extend upwardly, resulting in a reverse sequence of movements of the inter-engaged ejector 38 components and lifting of the push plate 50, thereby upwardly pushing and partly ejecting the powerbank from the powerbank holder 30. The user can then grasp and remove the powerbank, or press it back down into the powerbank holder until the push plate 50 clicks back into a locked position, having the effect of maintaining or "locking" the powerbank, which is now out of reach, atop the push plate within in the powerbank holder.

Figure 10:
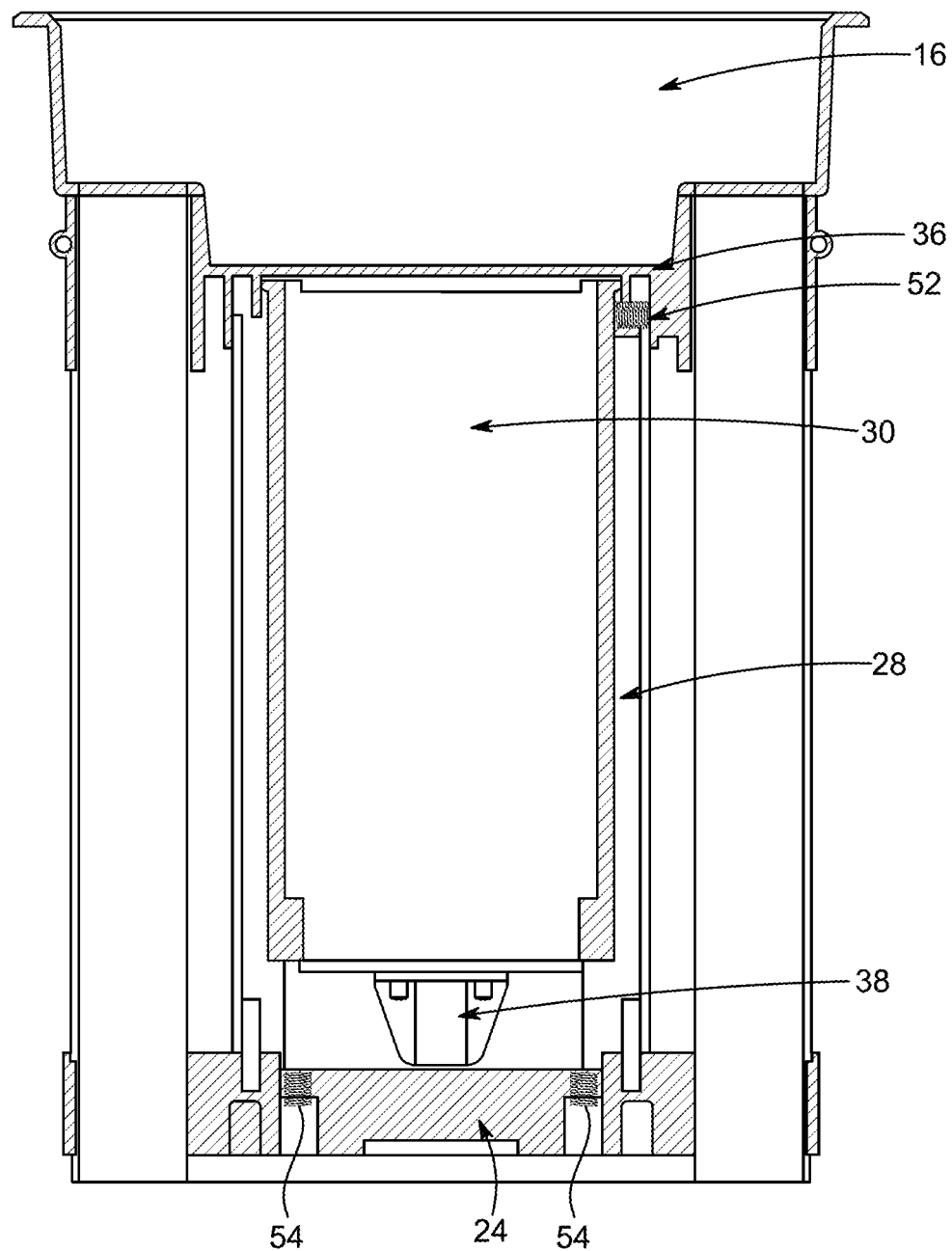
FIG. 10 is a front diagrammatic sectional view of the example handle mechanism.

Referring now to FIG. 10, there is shown a front sectional view of components of the frame member 18, holding compartment 28 and powerbank holder 30, the powerbank holder being held and locked in the holding compartment. The holding compartment may alternatively hold the combination powerbank 5, which has approximately the same dimensions as the powerbank holder 30 (though does not include ejector 38). In particular, there is shown parts of a first locking mechanism 52 for locking and unlocking the powerbank holder and/or combination powerbank 5 in the holding compartment, and a first ejection mechanism 54 for ejecting the powerbank holder and/or combination powerbank partly from the holding compartment upon unlocking.

Figure 11:
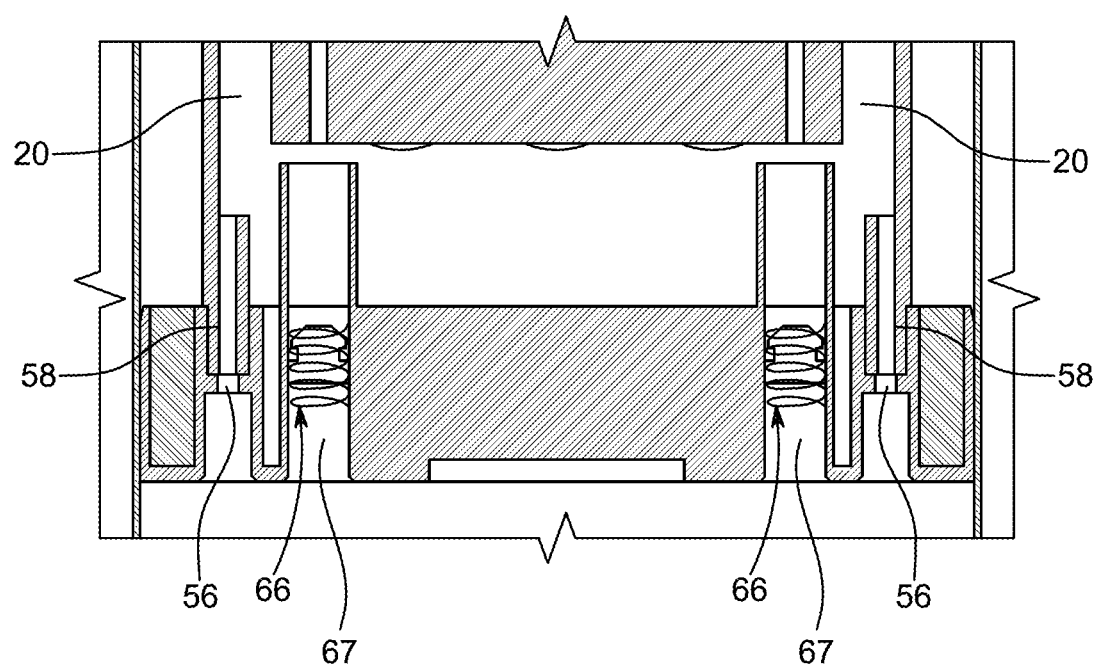
FIG. 11 is a magnified diagrammatic front sectional view of the handle mechanism, focusing in on ejection springs for ejecting a powerbank case.

The first ejection mechanism 54 is magnified in FIG. 11, showing it to comprise a pair of ejection springs 66 located towards the base of, and located on opposing sides of, the holding compartment 28, the spring 66 being in a compressed state with the powerbank holder 30 (or alternatively, the combination powerbank 5) locked and held in the holding compartment 28. Further shown in FIG. 11, is the location of the springs 66 being housed in the support cross member 24, and in particular a lower section 67 of each of the springs 66 is housed in the support cross member 24, and the springs 66 are located within the plane that spans the area between the elongate portions 20. Also shown in FIG. 11, is a pair of screws 56 projecting upwardly from the support cross member 24 and into a pair of threaded recesses defined in downwardly projecting tubes of the holding compartment 28, fixing the holding compartment 28 to the frame member 18.

Figure 12:
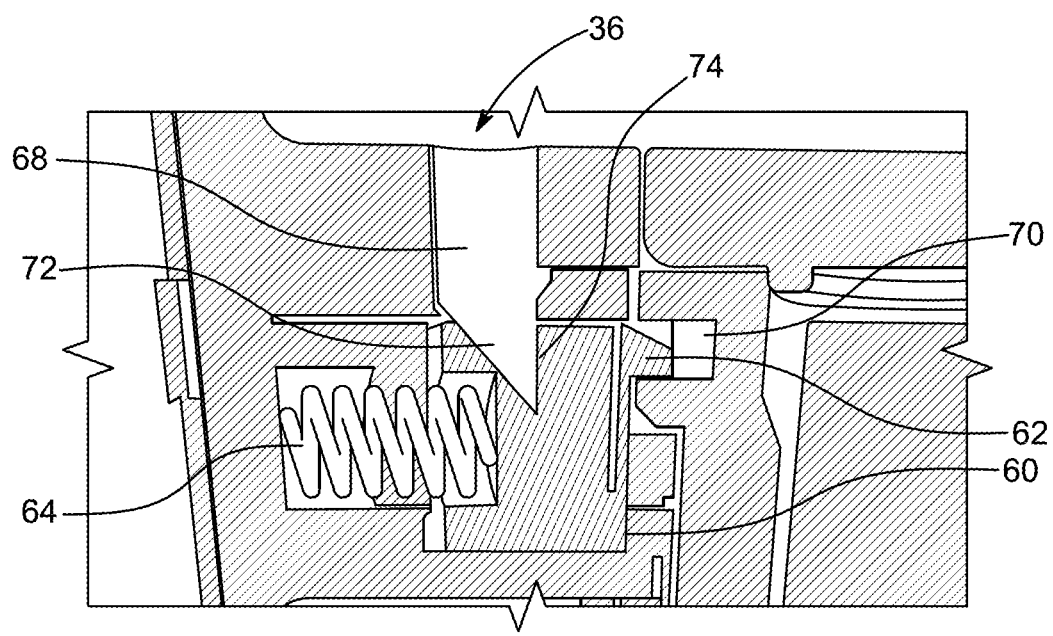
FIG. 12 is a magnified diagrammatic rear sectional view of the handle mechanism, focusing in on components of a locking mechanism used for locking and unlocking the powerbank case.

The first locking mechanism 52 is magnified in FIG. 12, showing it to comprise, in addition to the push button 36: a stem 68 extending down from and formed with the push button 36, the stem having a lower engagement portion 72 with a sloping surface; a stopper 60 housed in a portion of the frame member/handle housing, the stopper 60 having an upper engagement portion 74 defining an angled recess for engagement above with the lower engagement portion 72 of the stem 68, and having a projecting male portion or tab 62 projecting laterally from its top end; a spring 64 pressing into a spring recess of the block 60 defined in the side opposite to its projecting tab 62, and a female portion or stopper recess 70 defined in an outwardly facing surface of the powerbank holder (note, the female portion comprising the recess 7 in the combination powerbank 5 is located in an identical corresponding region of the powerbank 5). In the configuration shown, the tab 62 projects into the recess 70, thereby blocking upward movement of the powerbank holder and locking it into position in the holding compartment. Similarly, in the configuration show, were the combination powerbank 5 to be inserted into the holding compartment 28, the tab 62 projects into the recess 7, thereby blocking upward movement of the combination powerbank and locking it into position in the holding compartment.

According to the preferred embodiment depicted in FIG. 12, it may be seen that the first locking mechanism 52 engages an end portion of the powerbank holder 30. Likewise, where the combination powerbank 5 is inserted directly into the holding compartment 28, the first locking mechanism 52 engages the end portion 6 of the combination powerbank 5.

In order to remove the powerbank holder 30 or combination powerbank 5 from the holding compartment 28, after opening the lid 32, a user grasps a pointy object such as a pen and presses down with its pointy end against the push button 36, thereby depressing its downwardly extending stem 68. The lower engagement portion 72 of the stem 68 in turn presses against the upper engagement portion 74 of the stopper 60, causing lateral movement of the stopper 60 that compresses the spring 64 and withdraws the male portion or tab 62 from the female portion or recess 70, thereby unlocking the powerbank holder or combination powerbank 5.

Once the powerbank holder or combination powerbank 5 is unlocked, the compressed springs 64 (FIG. 12) extend upwardly, urging the powerbank holder or combination powerbank 5 upwardly so as to partly eject the powerbank holder or combination powerbank 5 from the holding compartment to a position where the top of the powerbank holder or combination powerbank 5 can be grasped and removed from the holding compartment 28. The powerbank holder may be ejected with or without the powerbank inside. Removal of the powerbank holder or combination powerbank 5 leaves the holding compartment 28 free for storage of objects, particularly documents relating to travel.

Thus, where the powerbank holder is used, the first locking mechanism 52 and first ejection mechanism 54 together form a redundancy release mechanism for the powerbank. That is, if the powerbank ejector 38 fails release the powerbank, such as if the mechanism becomes jammed, the redundancy release mechanism may be used as a backup to eject the powerbank by virtue of ejecting the powerbank holder 30 containing the powerbank from the powerbank compartment 38.

Alternatively, where the combination powerbank 5 is inserted directly into and held by the powerbank compartment, then the first locking mechanism may be the only ejecting locking mechanism that is provided in the apparats. The combination powerbank 5, in some embodiments, be alternately accessed via the interior of the luggage, and released by a process of removing parts of the apparatus to access the combination powerbank 5.

It will be understood from the disclosure herein that the handle mechanism apparatus, where located in a single piece of luggage, may be used both to directly receive the combination powerbank 5 and powerbank holder 30, so that the redundancy release mechanism may be used as required by the traveller (i.e. where, for example, due to regulatory requirements concerning luggage, it is desirable and/or mandatory to have a back-up release mechanism). Where the redundancy release mechanism is not required, the locking compartment 38 in the handle mechanism apparatus in luggage may directly receive a powerbank or combination powerbank, and this may allow for increased dimensions of the powerbank (i.e. it may have increased length, width and/or depth, compared to an arrangement where the powerbank holder 30 is used, so that the volume otherwise occupied by the powerbank holder is occupied by a larger battery).

It will further be appreciated that the powerbank holder 30 may also hold a combination powerbank powerbank (not shown, though it would be of smaller dimensions than the combination powerbank 5), providing added flexibility to the user.

The powerbank described above is designed to be removed from the luggage and thereafter carried or transported by the user according to their need (e.g. placing it in a smaller bag, or carrying it in a pocket).

Furthermore, it will be appreciated that the cross-member 24 provides structural support to the apparatus as a whole. In particular, the cross-member assists in the context of luggage which is fully packed and the contents pushes against the frame 18; in this scenario the forces acting on the frame can weaken or break the frame components, and place pressure on and damage other components connected thereto. The support cross member 24, and further, the support cross member in combination with the base cross member 26, operate to provide improved resistance to such pressures acting on the frame.

General Statements

Particular features, structures or characteristics expressed in the specification (including the claims and abstract) and drawings may be combined in any suitable manner, as would be apparent to one of ordinary skill in the art from this disclosure, in one or more embodiments/arrangements.

The claims following the Detailed Description are hereby expressly incorporated into this Detailed Description, with each claim standing on its own as a separate embodiment/arrangement of this invention.

Furthermore, while some embodiments/arrangements described herein may include some but not other features included in other embodiments/arrangements, combinations of features of different embodiments/arrangements are meant to be within the scope of the invention, and form different embodiments/arrangements, as would be understood by those in the art. For example, in the following claims, any of the claimed embodiments/arrangements can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Unless otherwise specified the use herein of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

The term "connected" may mean that two or more elements are either in direct physical or electrical contact, or that two or more elements are not in direct contact with each other but yet still co-operate or interact with each other.

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: "including" or "which includes" or "that includes" as used herein is also an open term that also means "including at least" the elements/features that follow the term, but not excluding others. Thus, including is synonymous with and means comprising.

The terms in the claims have the broadest scope of meaning they would have been given by a person of ordinary skill in the art as of the relevant date.

The terms "a" and "an" mean "one or more", unless expressly specified otherwise.

Neither the title nor the abstract of the present application is to be taken as limiting in any way the scope of the claimed invention.

Where the preamble of a claim recites a purpose, benefit or possible use of the claimed invention, it does not limit the claimed invention to having only that purpose, benefit of possible use.

In the present specification, terms such as "component", "item", "means", "apparatus" and "member" may refer to singular or plural items and are terms intended to refer to a set of properties, functions or characteristics performed by one or more items having one or more parts. It is envisaged that where a "component", "item", "means", "apparatus" or "member" or similar term is described as being a unitary object, then a functionally equivalent object having multiple components is considered to fall within the scope of the term, and similarly, where a "component", "item", "means", "apparatus" or "member" is described as having multiple items, a functionally equivalent but unitary object is also considered to fall within the scope of the term, unless the contrary is expressly stated or the context requires otherwise.

INDUSTRIAL APPLICABILITY

It is apparent from the above, that the arrangements described are applicable to luggage, bags, cases, including the components thereof, and related products.

The invention claimed is:

1. An apparatus for removably holding a powerbank, the apparatus including:
   a frame;
   a handle formed with or disposed on the frame;
   a first holder disposed on or in relation to the frame;
   a second holder removably held in or by the first holder, the second holder being adapted to removably hold a powerbank,
   wherein:
      the frame includes two elongate portions and a support cross member extending therebetween;
      the apparatus includes a first ejection mechanism of one or more biasing members that are spaced apart, and located on opposing sides of the first holder and have a lower section of each housed in the support cross member and able to bias the powerbank to an ejected position; and
      the apparatus further includes a locking mechanism able to lock the powerbank to the apparatus against the one or more biasing members and able to hold the powerbank in the second holder.

2. The apparatus according to claim 1, wherein the powerbank is a combination powerbank and mobile router, and wherein the combination powerbank and mobile router includes a SIM port for receiving a SIM card; and/or is adapted to provide internet access to one or more users via a wireless local area network.

3. The apparatus according to claim 1, wherein the apparatus comprises a housing for the handle and the locking mechanism is disposed on or in the housing for the handle.

4. The apparatus according to claim 3, wherein the locking mechanism is adapted to engage an end portion of the powerbank.

5. The apparatus according to claim 1, wherein the locking mechanism includes a male portion, and the first holder includes a female portion and the locking mechanism is moveable between a locked position and an unlocked position, whereby in the locked position the male portion of the locking mechanism is received by the female portion of the first holder to lock the powerbank in the first holder, and in the unlocked position the powerbank is removable from the first holder.

6. The apparatus according to claim 1, wherein the apparatus includes one or more fixing means to fix the support cross member to the frame and/or first holder.

7. The apparatus according to claim 1, wherein the locking mechanism is able to lockably hold the powerbank between the handle and the support cross member.

8. The apparatus according to claim 1, wherein the apparatus includes a base cross member extending between a base of each of the two elongate portions.

9. The apparatus according to claim 1, wherein the frame includes a lockable lid adapted to lockably hold the powerbank in the first holder, wherein, in use, a notch on the lockable lid is moved to a first position to unlock the lid and a second position to lock the lid.

10. The apparatus according to claim 1, wherein the first holder comprises a holding compartment, and the handle mechanism comprises a second ejection mechanism for ejecting the powerbank at least partly from the second holder.

11. The apparatus according to claim 10, wherein the second ejection mechanism is moveable between an ejection position and a holding position by the user pressing down on the powerbank to engage a push plate of the second ejection mechanism.

12. The apparatus according to claim 11, wherein the second ejection mechanism includes a second-ejection-mechanism biasing member adapted to urge the powerbank at least partly from the second holder when the second ejection mechanism is in the ejection position.

13. The apparatus according claim 1, wherein the powerbank includes one or more of, or any combination of: a USB port for charging; a USB port for wired connection of a user device to the powerbank for data exchange; an ethernet port for wired connection of a user device to the powerbank for data exchange, and a plurality of LED indicators to indicate one or more of power level; signal strength; and the type or mode of wireless connection.

14. A handle mechanism comprising an apparatus for removably holding a powerbank, the apparatus including:
   a frame;
   a handle formed with or disposed on the frame;
   a first holder disposed on or in relation to the frame;
   a second holder removably held in or by the first holder, the second holder being adapted to removably hold a powerbank;
   wherein:
      the frame includes two elongate portions and a support cross member extending therebetween;
      the apparatus includes a first ejection mechanism of one or more biasing members that are spaced apart, and located on opposing sides of the first holder and have a lower section of each housed in the support cross member and able to bias the powerbank to an ejected position; and
      the apparatus further includes a locking mechanism able to lock the powerbank to the apparatus against the one or more biasing members and able to hold the powerbank in the second holder.

* * * * *